(12) United States Patent
Bourgault et al.

(10) Patent No.: US 6,260,632 B1
(45) Date of Patent: Jul. 17, 2001

(54) COULTER ASSEMBLY WITH AN INSIDE FLOATING SCRAPER ASSEMBLY

(75) Inventors: Gerard F. Bourgault, St. Brieux; Peter Kondratowicz, Jr., Saskatoon, both of (CA); Ron Allan, Kelmscott (AU)

(73) Assignee: Bourgault Industries Ltd., St. Brieux (CA)

( * ) Notice: Subject to any disclaimer, the term of this patent is extended or adjusted under 35 U.S.C. 154(b) by 0 days.

(21) Appl. No.: 09/267,390

(22) Filed: Mar. 15, 1999

Related U.S. Application Data (63) Continuation-in-part of application No. 09/031,689, filed on Feb. 27, 1998, now Pat. No. 6,024,179.

(51) Int. Cl.[7] ................................................ A01B 15/16
(52) U.S. Cl. .......................................... 172/566; 172/558
(58) Field of Search ............................... 172/49, 96, 556, 172/558, 559, 560, 561, 562, 563, 564, 566, 572; 111/52, 139, 140, 191, 130

(56) References Cited

U.S. PATENT DOCUMENTS

| | | |
|---|---|---|
| 493,182 | 3/1893 | Platt . |
| 1,120,875 | 12/1914 | Wittler . |
| 1,545,895 | 7/1925 | Hamilton . |
| 2,442,727 | 6/1948 | Hyland . |
| 2,489,385 | 11/1949 | Paul . |
| 2,617,344 | 11/1952 | Carney . |
| 4,269,274 | * 5/1981 | Robertson et al. .................. 172/699 |
| 4,502,547 | 3/1985 | MacIntyre . |
| 4,589,498 | * 5/1986 | Wetmore .............................. 172/719 |
| 4,614,380 | * 9/1986 | Allen ..................................... 299/41 |
| 4,628,840 | 12/1986 | Jacobson . |
| 5,320,451 | * 6/1994 | Garvey et al. ....................... 405/181 |
| 5,396,851 | * 3/1995 | Beaujot ................................. 111/187 |
| 5,461,994 | * 10/1995 | Zimmerman ........................ 111/121 |
| 5,626,196 | 5/1997 | Hughes ................................ 172/558 |
| 6,024,179 | * 2/2000 | Bourgault ............................ 172/566 |

* cited by examiner

Primary Examiner—Robert E. Pezzuto
(74) Attorney, Agent, or Firm—Hollander Law Firm, P.L.C.

(57) ABSTRACT

A coulter assembly is provided to create furrows in a field, while at the same time reducing the amount of soil and debris which accumulates on the coulter disc. The coulter assembly has a disc for creating furrows, with a floating scraper blade on the inner side to keep the inner side of the disc free of debris. The scraper blade also assists in maintaining the furrow once it has been opened by the disc. The scraper blade has a leading edge constructed of carbide and inserts attached to the scraper blade for reducing wear on the scraper blade during operation. A tine extends across the outer side of the disc in a configuration that prevents soil from adhering to the outer side of the disc, and in trash covered fields, trash will wrap around the tine to act as an organic wear pad between the disc and the tine.

25 Claims, 9 Drawing Sheets

COULTER ASSEMBLY WITH AN INSIDE FLOATING SCRAPER ASSEMBLY

RELATED APPLICATIONS

This application is a continuation in part (CIP) of U.S. patent application Ser. No. 09/031,689 filed Feb. 27, 1998, now U.S. Pat. No. 6,024,179.

FIELD OF THE INVENTION

The present invention relates to agricultural implements and is particularly concerned with a coulter assembly with an inside floating scraper with a leading edge constructed of carbide.

BACKGROUND OF THE INVENTION

Farmers frequently plant crops in fields that have debris and waste material covering the field. Such material may consist of straw or old crops, which is frequently referred to as trash. In order to plant seeds or deposit fertilizer in such fields, coulter assemblies are tools that are used to create furrows or seed trenches in the soil. These coulter assemblies are typically attached, in a side-by-side configuration, to a frame which is then pulled behind a tractor to create a slot that allows the injection of agents, such as fertilizer and seed, into a field.

One problem that may occur with known coulter assemblies is an accumulation of dirt and debris between the discs and the struts as they rotate through the soil. If the soil is wet, it may stick and build up on the discs, which can inhibit rotation of the discs, cause poor disc penetration, excessive soil disturbance and create excessive draft forces. Conventional scrapers are made of steel and tend to wear relatively quickly and require a high scraper pressure when used in heavy, wet, clay soil. Once the scraper wears, the contact area between the scraper and the disc increases, further increasing the spring force that is required to keep the scraper in contact with the disc to keep the disc clean, which consequently increases the drag force on the coulter assembly. Moreover, if the field consists of sections of clay and sandy soil, the coulter assembly has less frictional force available to turn the coulter disc when it is pulled through the sections of sandy soil. The high spring force on the scraper blade may cause difficulties since the disc may stop turning when pulled through the sections of sandy soil, thereby causing operational problems.

In U.S. Pat. No. 493,182 issued Mar. 7, 1893, Platt teaches the use of a rod, which rotates freely about a spool between discs, to break up clogs of dirt and debris which form as the coulter discs create a furrow. The rod drags behind the discs and as soil accumulates, the rod rotates upward until the rod is stopped above the discs. The rod breaks the soil clumps which fall beside the disc. A scraper blade is also provided which is subject to a spring force to keep the scraper blade in contact with a surface of the coulter. As the coulter disc rotates, the scraper blade maintains contact with the surface to remove debris.

In U.S. Pat. No. 5,626,196 issued May 6, 1997, Hughes teaches the use of a blade which continuously contacts the surfaces of a coulter disc to scrape the disc and clean it as the disc rotates. In an embodiment, the scraper blade is made of plastic to permit flexibility, as it also bends when in contact with the soil. This scraper blade performs the dual role of acting as a scraper/cleaner and also as a closer. Once the disc opens a furrow in the soil, the scraper blade acts as a closer since it will force some of the soil back into the furrow after seeds have been deposited.

SUMMARY OF THE INVENTION

It is an object of the present invention to provide an improved coulter assembly, particularly one which utilizes a scraper blade on the inside of the disc to clean the disc as it rotates.

In accordance with one aspect of the present invention, there is provided a coulter assembly adapted to be mounted on a frame of a farm implement comprising:

a mounting bracket; a strut; means for connecting said strut to said mounting bracket; a two-sided disc, said two sides of said disc comprising an inner side and an outer side, said disc being rotatably attached to said strut; a torque arm pivotally attached to the strut; a scraper assembly slidably and rotatably mounted to the torque arm and facing the inner side of the disc; and resilient means mounted on the torque arm wherein said scraper assembly is urged against the inner side of the disc by said resilient means of said torque arm and whereby said scraper assembly cleans the inner surface of said disc during operation of the coulter assembly.

In accordance with another aspect of the present invention, there is provided a coulter assembly adapted to be mounted on a frame of a farm implement comprising:

a mounting bracket; a strut; means for connecting said strut to said mounting bracket; a two-sided disc, said two sides of said disc comprising an inner side and an outer side, said disc being rotatably attached to said strut; a torque arm pivotally attached to the strut; a scraper assembly slidably and rotatably mounted to the torque arm and facing the inner side of the disc, said scraper assembly comprising: a scraper blade having a leading edge attached thereto and constructed of carbide; and a hollow tubular member attached to the scraper blade, said tubular member adapted to matingly engage said torque arm and being slidably maintained thereon with a retaining means; and resilient means mounted on the torque arm wherein said leading edge of said scraper assembly is urged against the inner side of the disc by said resilient means of said torque arm and whereby said scraper blade cleans the inner surface of said disc during operation of the coulter assembly.

In accordance with another aspect of the present invention, there is provided a coulter assembly comprising a coulter assembly adapted to be mounted on a frame of a farm implement comprising: a mounting bracket; a strut; means for connecting said strut to said mounting bracket; a two-sided disc, said two sides of said disc comprising an inner side and an outer side, said disc being rotatably attached to said strut; a torque arm assembly fixedly attached to the strut, said torque arm assembly including a torque arm; a scraper assembly slidably and rotatably mounted to the torque arm and facing the inner side of the disc, said scraper assembly comprising: a scraper blade having a leading edge attached thereto and constructed of carbide; and a hollow tubular member attached to the scraper blade, said tubular member adapted to matingly engage said torque arm and being slidably maintained thereon with a retaining means; and resilient means mounted on the torque arm wherein said leading edge of said scraper assembly is urged against the inner side of the disc by said resilient means of said torque arm assembly and whereby said scraper blade cleans the inner surface of said disc during operation of the coulter assembly.

In accordance with another aspect of the present invention, there is provided a coulter assembly comprising: a substantially vertically oriented mounting bracket having a lower end and an upper end; a strut, having an upper end and a lower end; a torque arm assembly fixedly attached to the strut, said torque arm assembly including a torque arm; a coupling attached to the upper end of the strut and pivotally connected to the lower end of the mounting bracket; a disc, rotatably attached to the lower end of the strut whereby an inner side of the disc faces the strut; a scraper assembly slidably and rotatably mounted to the torque arm and facing the inner side of the disc, said scraper assembly comprising: a scraper blade having a leading edge attached thereto and constructed of carbide; and a hollow tubular member attached to the scraper blade, said tubular member adapted to matingly engage said torque arm and being slidably maintained thereon with a retaining means; and resilient means mounted on the torque arm wherein said leading edge of said scraper assembly is urged against the inner side of the disc by said resilient means of said torque arm assembly and whereby said scraper blade cleans the inner surface of said disc during operation of the coulter assembly; and a spring connected between the mounting bracket and the coupling whereby the coupling will rotate upon elevation of the strut to avoid obstacles when in operation.

In accordance with another aspect of the present invention, there is provided a coulter assembly comprising: a strut, having one end adapted to be mounted to the frame of a farm implement; a two-sided disc having an inner side and an outer side rotatably attached to said strut; a scraper attached to the strut having a leading edge attached thereto facing the inner side of the disc, said leading edge constructed of carbide; wherein said leading edge of said scraper is resiliently biased against the inner side of the disc to clean the inner side of the disc during operation of the coulter assembly.

In accordance with another aspect of the present invention, there is provided a scraper for use in a coulter assembly having a disc with an inner side; said scraper having a leading edge for scraping an inner side of a disc wherein said leading edge is constructed of carbide.

Advantages of the present invention include: increased wear resistance of the scraper blade when the coulter assembly is used to create furrows in fields; reduced scraper pressure required to keep the coulter disc clean in operation, and reduction in drag on the coulter assembly.

BRIEF DESCRIPTION OF THE DRAWINGS

The present invention will be further understood from the following description with references to the drawings in which.

DETAILED DESCRIPTION OF THE PREFERRED EMBODIMENT

Certain terminology is used in this description for convenience and reference and is not intended to be limiting. For example, the words "forward", "rear", "up", "down" and derivatives thereof will refer to directions in the drawings to which reference is made. In FIGS. 1 to 10, the direction indicated by the arrow in FIG. 1 will be referred to as "forward".

Figure 1:
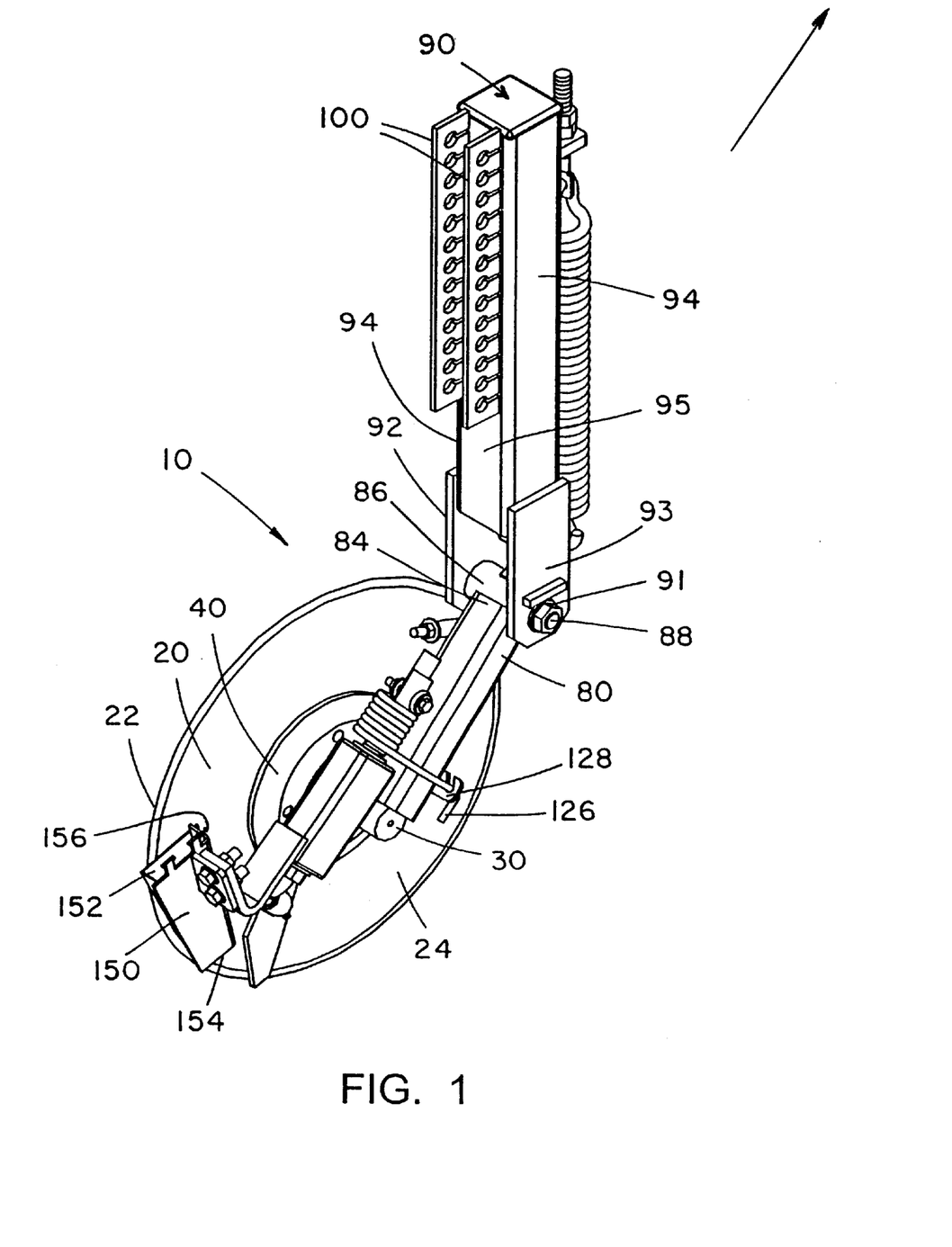
FIG. 1 is a perspective view of a coulter assembly according to an embodiment of the invention.

Referring firstly to FIG. 1, a coulter assembly according to an embodiment of the invention is generally indicated by 10.

Disc 20 is substantially circular with an outer perimeter 22 that is bevelled to a sharp edge to permit disc 20 to easily enter soil to create a furrow or a seed or fertilizer trench during field operations. Disc 20 is preferably made of steel and is approximately 45 cm. in diameter. There is a bore (not shown) in the center of disc 20 to permit the mounting of disc 20 on hub 40. Disc 20 has two sides which will be referred to as an inner side 24, seen in FIGS. 1 and 2, and an outer side 26, seen in FIGS. 3 and 4.

Figure 6:
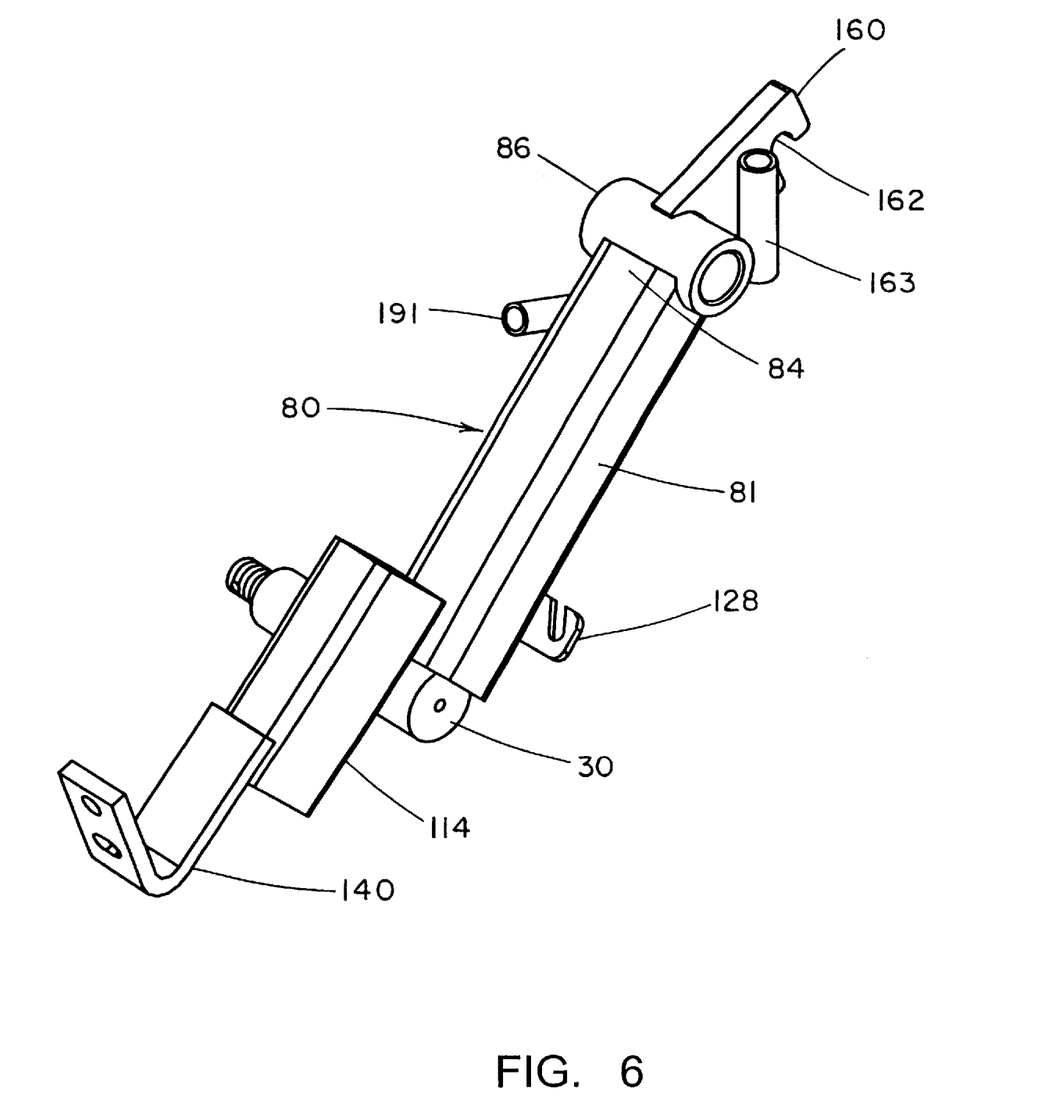
FIG. 6 is an enlarged perspective view of the strut, spindle, housing an d bracket of the coulter assembly of FIG. 1.
Figure 7:
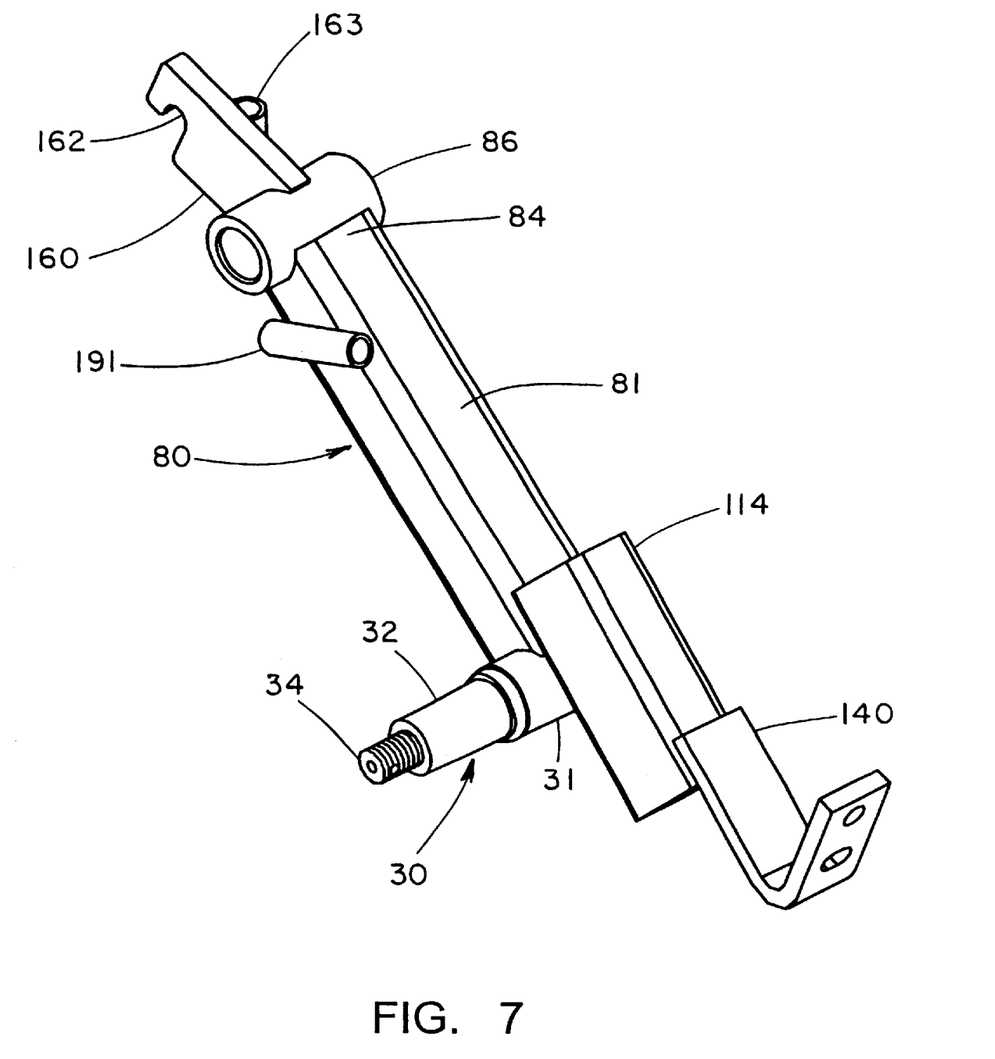
FIG. 7 is an enlarged perspective view of the strut, spindle, housing and bracket of the coulter assembly of FIG. 1.

Spindle 30 is a member that acts as an axle to support hub 40. As shown in FIGS. 6 and 7, spindle 30 comprises section 31, 32 and 34. Sections 31 and 32 are solid, co-axial rodshaped sections and section 32 has a smaller diameter than section 31. Section 34 is a threaded section extending from section 32 and is co-axial with section 32.

Figure 5:
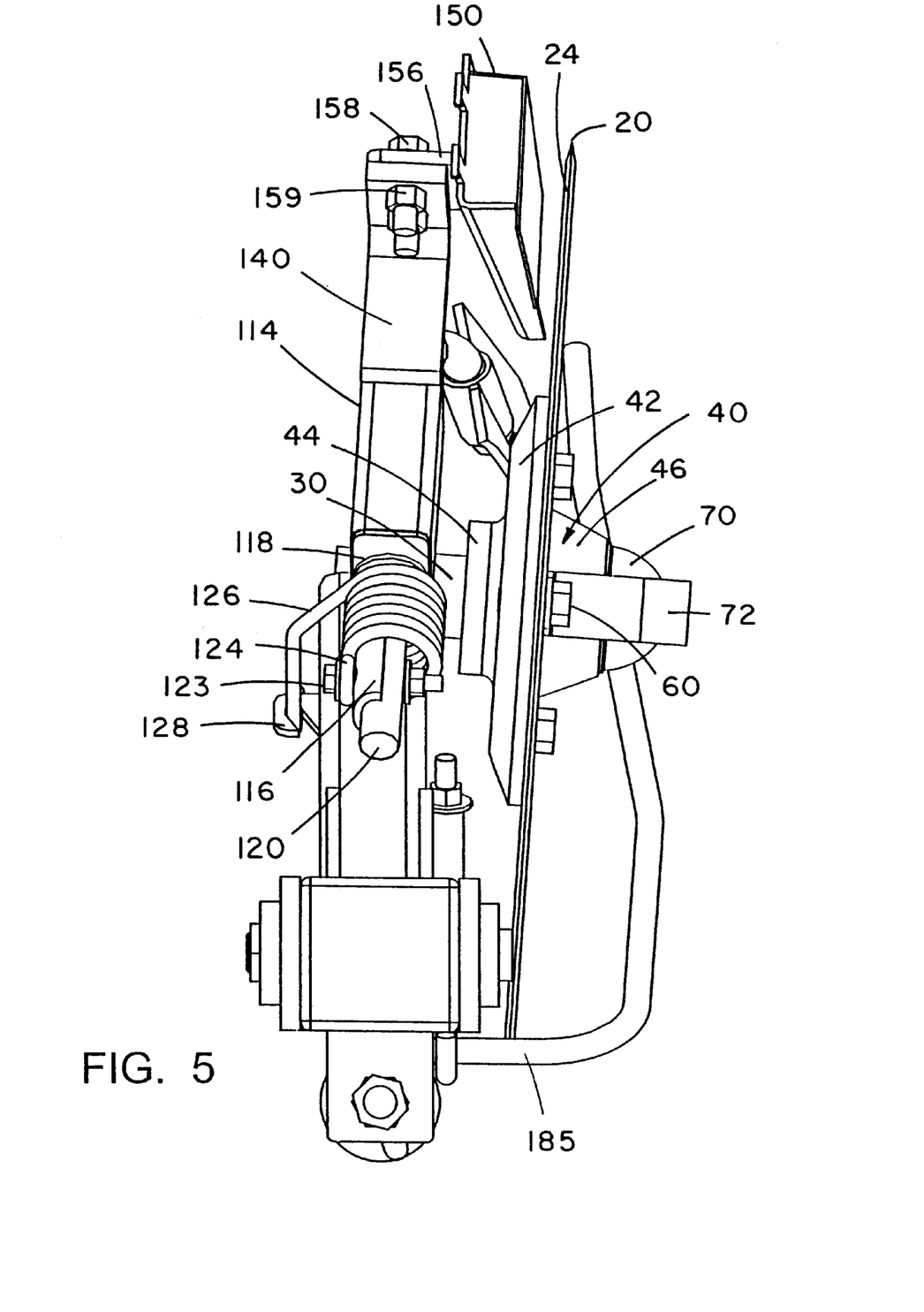
FIG. 5 is a top view of the coulter assembly of FIG. 1.

Hub 40 is a one-piece member, shown in the top view of the coulter assembly in FIG. 5, having a conical shaped section 42, a tubular section 44, and a shoulder 46. Hub 40 has a bore (not shown) through its center, and hub 40 slides over spindle 30. Hub 40 acts as a mount for disc 20.

Figure 2:
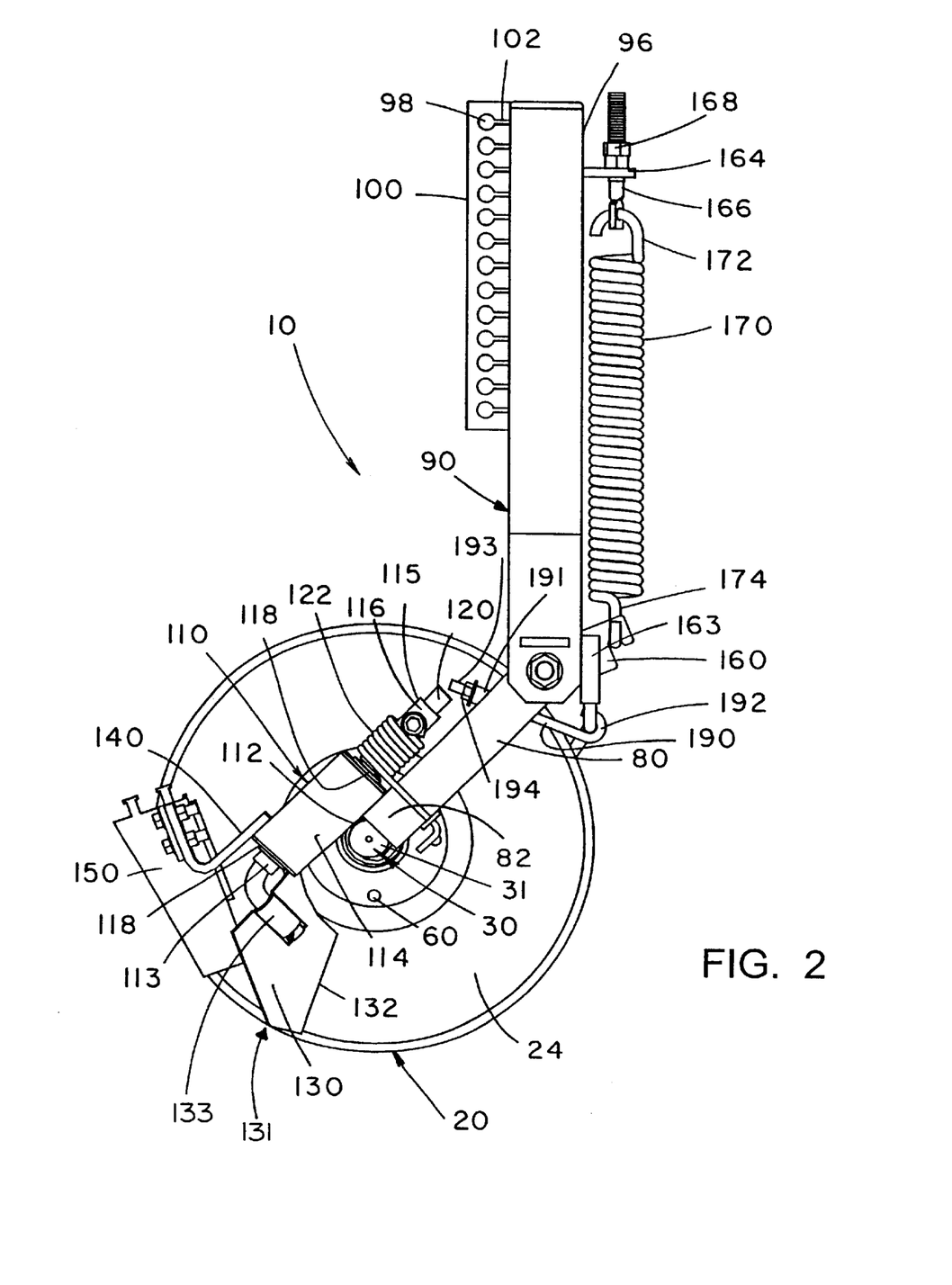
FIG. 2 is a side view of the coulter assembly of FIG. 1.
Figure 4:
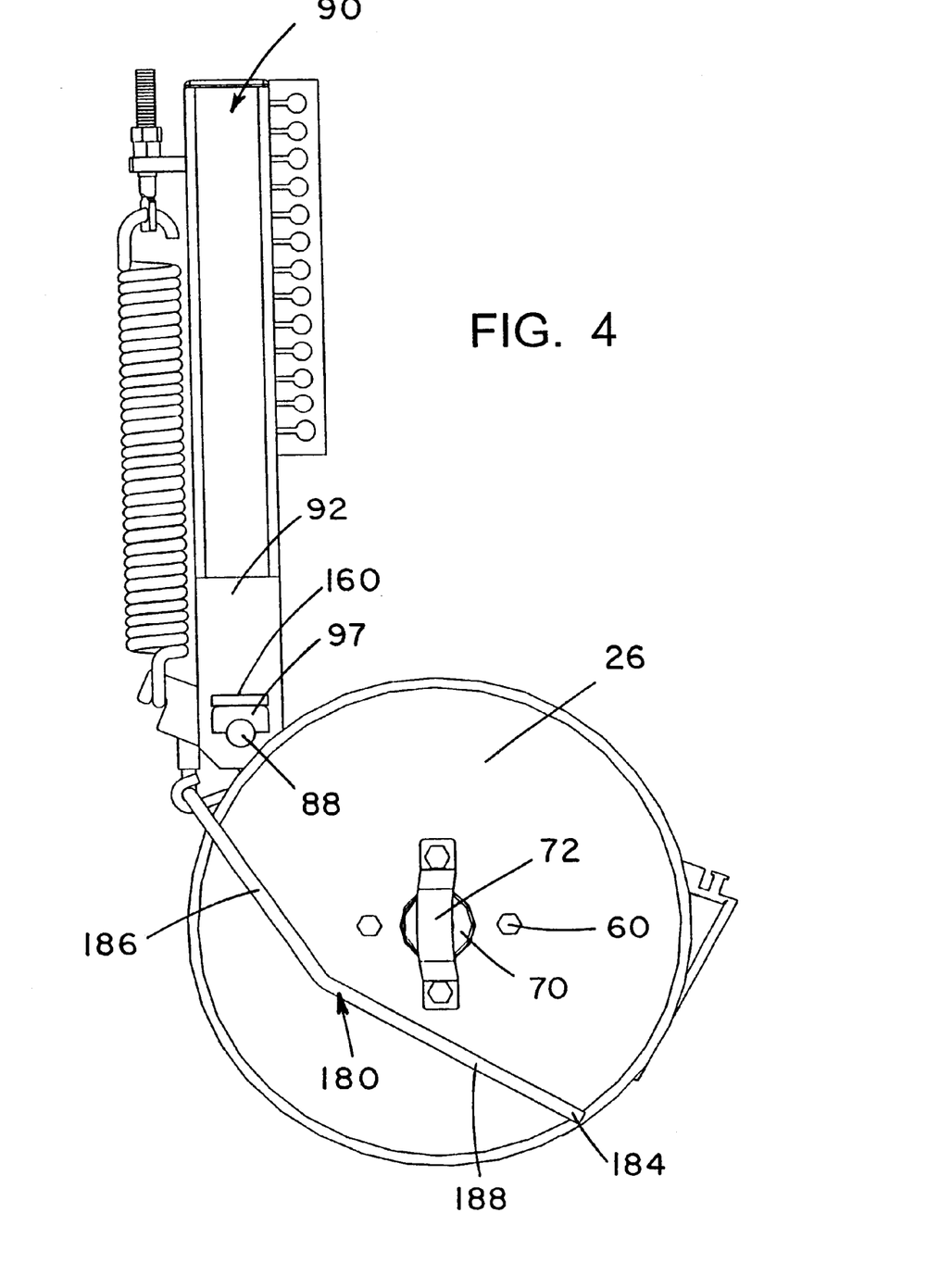
FIG. 4 is a side view of the coulter assembly of FIG. 1.

As shown in FIG. 5, disc 20 slides over the shoulder 46 of hub 40 until the inner side 24 of disc 20 abuts against conical shaped section 42 of hub 40. Disc 20 is secured to hub 40 with bolts 60. As shown in FIGS. 4 and 5, four bolts 60 pass through holes (not shown) in disc 20, and bolts 60 are threaded into holes in hub 40 that are adapted to receive bolts 60, as shown in FIG. 2. As a result of this configuration, disc 20 is secured on hub 40, and disc 20 is free to rotate about spindle 30 via hub 40.

Figure 3:
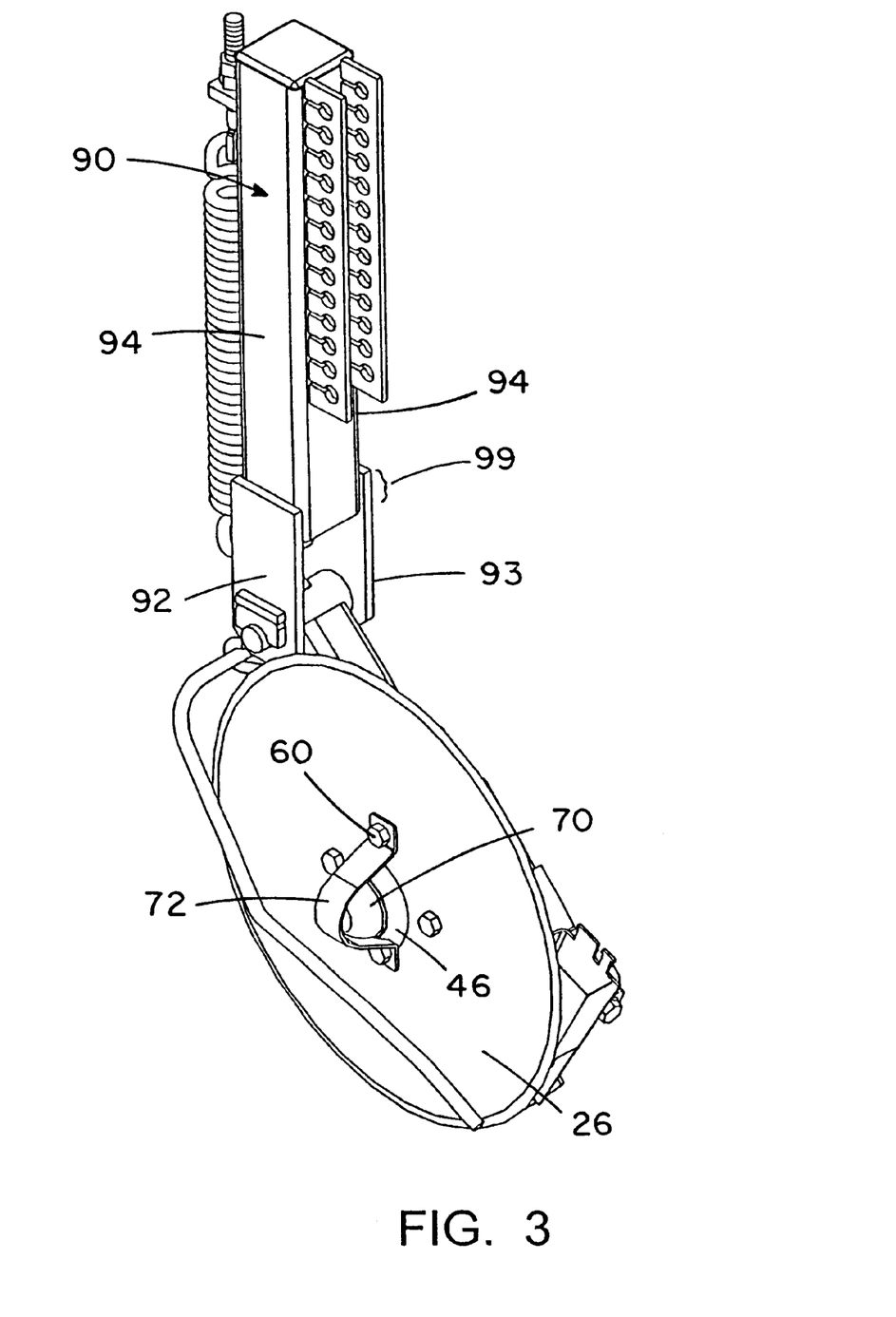
FIG. 3 is a perspective view of the coulter assembly of FIG. 1.

As shown in FIGS. 3 and 5, a dust cap 70 is attached to spindle 30 against shoulder 46 to prevent dust and debris from interfering with rotation of disc 20. As shown in FIGS. 3 and 4, a dust cap shield 72 is attached to the outer side 26 of disc 20 to provide further protection to the dust cap 70 and spindle 30. In the illustrated embodiment, dust cap 70 is semi-spherical. As shown in FIGS. 3 and 4, dust cap shield 72 is a rectangular steel plate with two ends attached to the outer side 26 of disc 20. Two of the bolts 60 pass through the ends of dust cap shield 72 to secure dust cap shield 72 to the outer side 26 of disc 20. The remaining plate is bent in a configuration which adapts to the exterior of shoulder 46 and along the semi-spherical shape of dust cap 70.

Referring to FIG. 2, spindle 30 extends beyond the hub 40 on the inner side 24 of disc 20 and is attached to strut 80, preferably by a weld between section 31 of spindle 30 and strut 80. Strut 80 is located opposite the inner side 24 of disc 20, and as shown in FIG. 2, strut 80 is welded at a first end 82 to the circular surface of section 31 of spindle 30. As shown in FIG. 1, strut 80 extends upward and forward from spindle 30 such that a second end 84 of strut 80 is located outside the outer perimeter 22 of disc 20.

As shown in FIGS. 6 and 7, strut 80 preferably includes a one-piece steel hollow member 81 with a rectangular cross-section. Attached at the second end 84 of strut 80 is a coupling 86, which is a tubular shaped member. As shown in FIG. 1, coupling 86 rotates about pin 88, which is fixed at either end to plates 92 and 93. In FIG. 1, pin 88 is shown to be secured to plate 93 with a nut 91. As shown in FIG. 4, pin 88 is welded to a plate 97, which is located directly above pin 88 on plate 92. Plate 97 is shown as a rectangular plate with a notch adapted to receive pin 88. Directly above plate 97 is a substantially rectangular stub 160, which is welded to plate 92. As a result of this configuration, pin 88 is restrained from rotation when mounted between plates 92 and 93. Plates 92 and 93 are rectangular plates which extend substantially vertically from the location where they are fixed to the ends of pin 88 until they reach mounting bracket 90.

Figure 8:
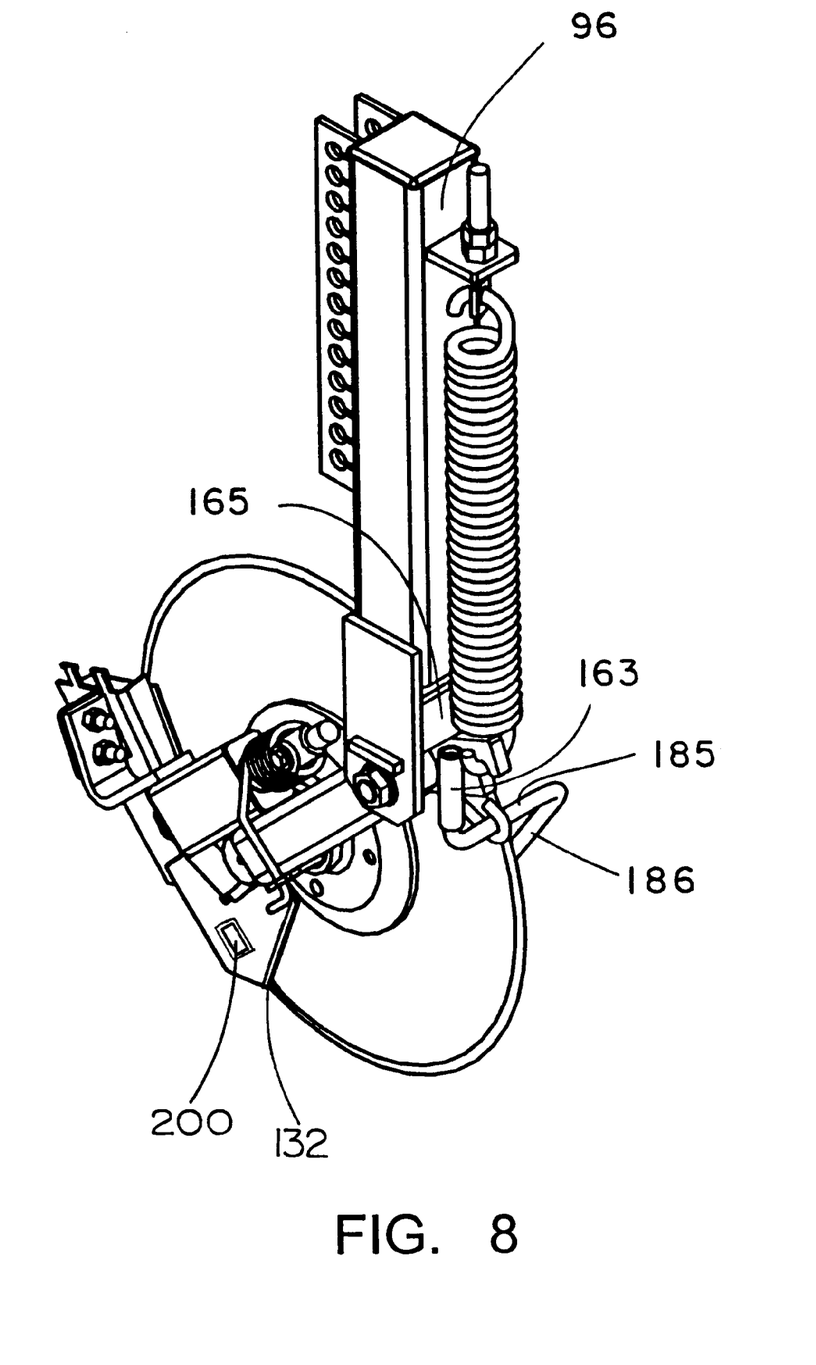
FIG. 8 is a perspective view of the coulter assembly of FIG. 1.

As shown in FIG. 1, mounting bracket 90 extends substantially vertically from plates 92 and 93, and is used to attach coulter assembly 10 to an agricultural instrument, such as a horizontal beam (not shown) pulled behind a tractor. Accordingly, a number of coulter assemblies 10 may be arranged in a side-by-side configuration along the beam. As shown in FIG. 1, mounting bracket 90 is preferably a member with a square cross-section, defined by two sides 94, a rear section 95 and a front section 96, which is shown in FIG. 8. As shown in FIG. 3, a portion of plates 92 and 93 overlap a portion of sides 94 of mounting bracket 90, and preferably, welds are employed in the overlap region 99 to attach plates 92 and 93 to sides 94 of mounting bracket 90. As shown in FIG. 1, two adjustment plates 100 are attached to the front section 96 of mounting bracket 90 for a length of approximately 35 cm measured from the top of mounting bracket 90. Adjustment plates 100 have two opposing long edges, one of which is indicated as 102 in FIG. 2, and adjustment plates 100 are attached to mounting bracket 90 with a weld between one of the long edges 102 and rear section 95. The plates 100 are spaced apart from each other and attached to rear section 95 so that adjustment plates 100 are substantially parallel to sides 94 of mounting bracket 90.

As shown in FIG. 2, each adjustment plate 100 contains a number of apertures 98, positioned along the length of plates 100. Apertures 98 are used to connect mounting bracket 90 to a beam. The number of apertures 98 permits a setting that allows various depths of soil trenches to be created with disc 20. In the embodiment, apertures 98 are shown as key-shaped, but it is understood that a hole or other aperture may perform the same function.

As shown in FIG. 2, a torque arm assembly 110 is attached to strut 80 and to section 31 of spindle 30, and spindle 30 is shown as extending past inner side 24 of disc 20. Scraper torque arm assembly 110 comprises a housing 114, which is shown in the embodiment to be a box-shaped section, rectangular in cross-section, and extends from a point below and rearward of spindle 30 to a position forward and above spindle 30. Preferably, scraper torque arm assembly 110 is attached to strut 80 and spindle 30 by welding housing 114 to both spindle 30 and strut 80 at the location identified as 112.

As shown in FIG. 5, spacer 116 is semi-circular in shape and lies under spring 122 and properly positions spring 122 on torque arm 120. Spacer 116 includes at least one hole to secure it in position with bolt 123. Bolt 123 secures both spring 122 and spacer 116. Washers 118 are attached at either end of housing 114. A torque arm 120 is inserted through the center of spacer 116 and co-axial with the spacer. As shown in FIG. 2, torque arm 120 extends beyond the forward end 115 and rearward end 113 of spacer 116 and torque arm 120 is free to rotate relative to housing 114.

As shown in FIG. 5, a bolt 123 attaches torsion spring 122, or other resilient means, to torque arm 120 and spacer 116 by pressing one end 124 of torsion spring 122 against the exterior surface of spacer 116. There is a hole (not shown) extending transversely through torque arm 120, which aligns with a hole (not shown) in the spacer 116 to receive bolt 123 at the forward end 115 of spacer 116. Torsion spring 122 is shown in FIG. 2 as a helical spring enclosing spacer 116 and torque arm 120, extends downward and rearward toward housing 114. The second end 126 of torsion spring 122 is attached to strut 80, as shown in FIG. 1, via a hooked member 128 which is attached, preferably by welds, to strut 80. Alternatively, the second end 126 of torsion spring 122 may be attached to the housing 114 or another section of the torque assembly 110.

As shown in FIG. 2, at the lower end of housing 114, torque arm 120 bends at right angles away from the long axis of housing 114, and at the same time extends toward the inner side 24 of disc 20. The lower end of torque arm 120 is attached to the scraper assembly 131. The scraper assembly 131 is constructed of a tubular member 133, scraper blade 130 and leading edge 132. Preferably, the tubular member 133 and scraper blade 130 are made of steel and joined together with arc welds. As shown in FIG. 2, torque arm 120 is attached to the scraper assembly 131 via the tubular member 133. Torque arm 120 is inserted into the tubular member 133 and secured thereto to prevent the scraper assembly 131 from sliding off the torque arm 120 and at the same time, scraper assembly 131 may rotate about the torque arm 120 until the scraper assembly 131 contacts the inner side 24 of disc 20. A number of connections can be located at the end of the section of torque arm 120 that slides through the tubular element 133 to retain the torque arm 120, such as, for example, a nut and a bolt, a spring pin or a roll pin.

As shown in FIG. 2, scraper blade 130 has a leading edge 132 that is constructed of carbide material. This carbide material is generally described as a cemented hard carbide of which there are many grades. The configuration of the torsion spring 122, spacer 116, torque arm 120, and housing 114 results in torque being exerted on the torque arm 120, and as a result, the leading edge 132 of scraper blade 130 is urged against and maintains contact with inner side 24 of disc 20.

Figure 9:
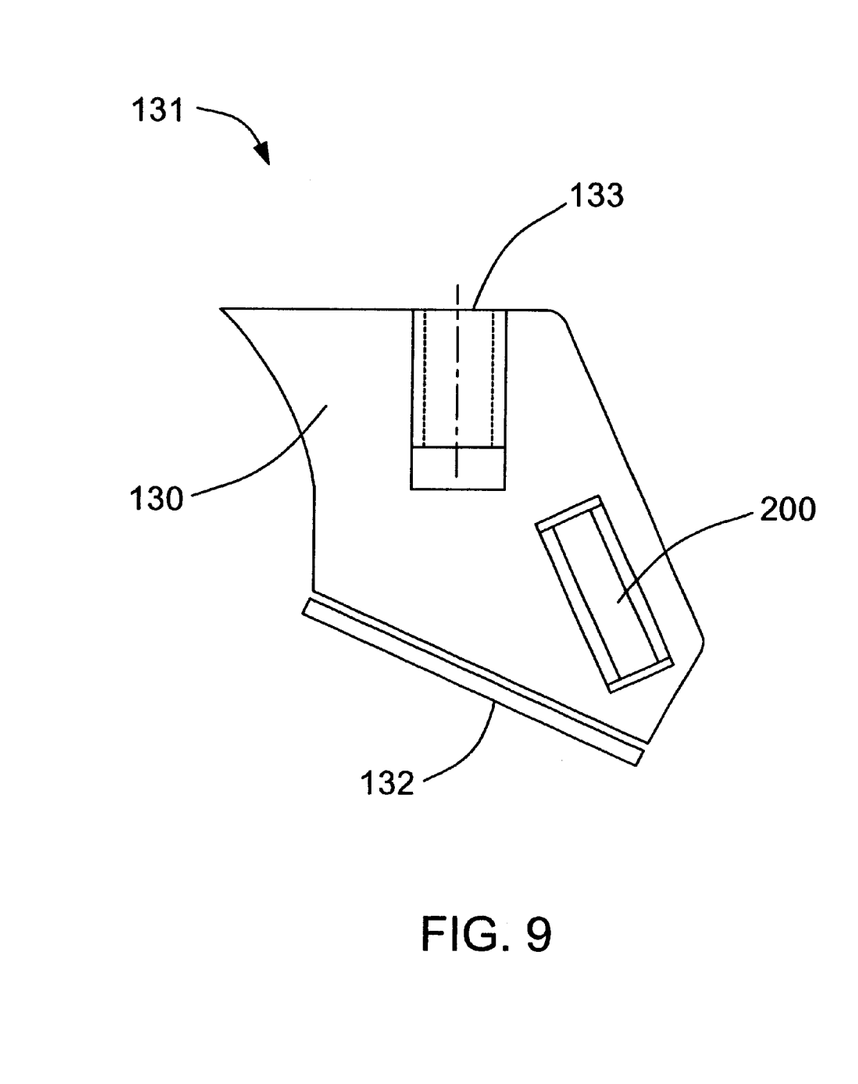
FIG. 9 is a front view of a scraper assembly according to an embodiment of the invention.
Figure 10:
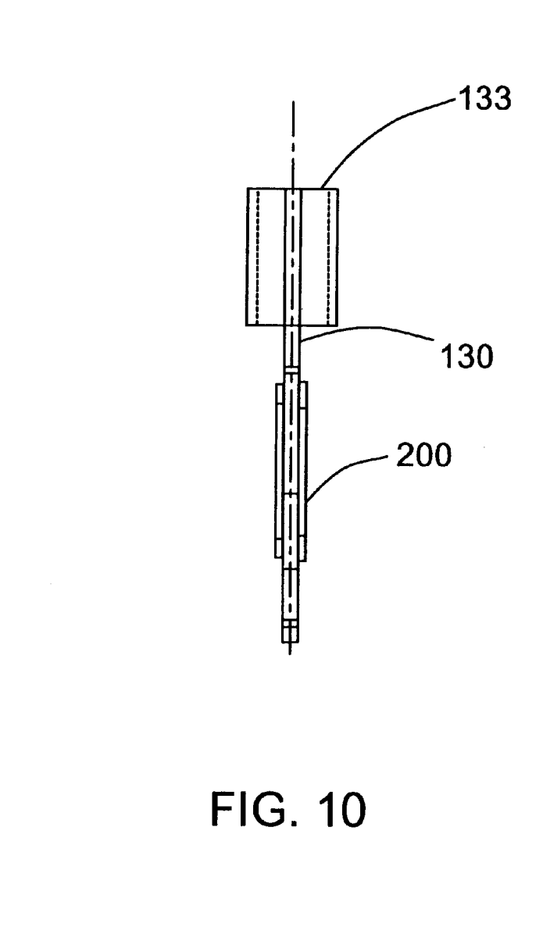
FIG. 10 is a side view of the scraper assembly of FIG. 9.

In the illustrated embodiment, insert 200 is attached to scraper blade 130 to improve the scraper blade's resistance to wear. As shown in FIGS. 9 and 10, insert 200 extends through an opening (not shown) in scraper blade 130 and is attached to scraper blade 130 with arc welds. Preferably, insert 200 is constructed of cast iron, but any wear resistant material may be used. Although insert 200 is shown as protruding past both sides of scraper blade 130, it may extend past only one of the sides of scraper blade 130.

As shown in FIGS. 2, 6 and 7, a bracket 140 is attached to the top of the housing 114, preferably with a weld. As shown in FIG. 1, bracket 140, shown in the embodiment as L-shaped, joins housing 114 to tube holder 150. Tube holder 150 is located on the inner side of disc 20 in a position to deposit seeds or fertilizer in the trench created by disc 20. Preferably, tube holder 150 is a trapezoidal shaped container with an open top 152 and bottom 154. Seeds or fertilizer will feed into the top 152 of tube holder 150 from one or more tubes (not shown) and exit tube holder 150 at the bottom 154 where they will fall into a furrow created by disc 20. As shown in FIGS. 1 and 5, tube holder 150 has a flange 156 extending transversely from tube holder 150. As shown in FIG. 5, flange 156 is attached to bracket 140, preferably with bolts 158 and nuts 159.

As shown in FIGS. 2, 6 and 7, an arm 160 is attached to coupling 86, preferably with a weld, and arm 160 extends forward and upward from coupling 86. Arm 160 contains a hook shaped feature 162 (see FIGS. 6 and 7). As shown in FIG. 2, near the top of mounting bracket 90, a tab 164 is attached to front section 96 of mounting bracket 90, preferably with a weld. Tab 164 extends horizontally, and contains an aperture (not shown). An eyebolt 166 is inserted through the aperture in tab 164 and secured with nuts 168. As shown in FIG. 2, a spring 170 with an upper end 172 and lower end 174 is positioned between arm 160 and tab 164. Upper section 172 is inserted through the aperture in eyebolt 166, and lower section 174 is secured in the hook shaped feature 162 in arm 160. Accordingly, spring 170 is substantially vertical. As shown in FIG. 8, a stop-tab 165 is attached, preferably with welds, between plates 92 and 93 at a position above arm 160, such that stop-tab 165 stops arm 160 from moving upward. Accordingly, spring 170 is in tension, pulling upward on arm 160, but stop-tab 165 acts as a "stop" to define the position shown in FIG. 2. If arm 160 moves downward due to clockwise rotation of coupling 86, spring 170 exerts greater tension between arm 160 and tab 164, thereby urging arm 160 back to a position against stop-tab 165.

As shown in FIGS. 2 and 6, a cylindrical shaped bushing 163 is attached, in a substantially vertical direction, to the outer side of arm 160. As shown in FIG. 2, a tine 180 has a first end which is inserted inside bushing 163. Tine 180 then extends downward from coupling 86 while remaining outside the outer perimeter 22 of disc 20, then tine 180 bends at substantially a right angle so that tine 180 passes from the inside of disc 20, as shown in FIGS. 2 and 8, to the outside of disc 20, as shown in FIG. 4, resulting in a substantially horizontal section 185 as shown in FIGS. 5 and 8. Once tine 180 passes the outer side 26 of disc 20, it bends downward and rearward in a path that extends across the outer side 26 of disc 20, shown as sections 186 and 188 in FIG. 4. Section 186 of tine 180 is substantially equidistant from the outer side 26 of disc 20, then tine 180 extends downward, rearward, and toward the outer side 26 of disc 20 in section 188 such that the second end 184 of tine 180 terminates on outer side 26 of disc 20, but inside outer perimeter 22. The second end 184 of tine 180 touches the outer side 26 of disc 20. In the illustrated embodiment, tine 180 is shown to be a continuous elongate member with a circular cross section. While this embodiment is preferred, it is understood that a similar device may be used, for example, a bar with a square or hexagonal cross-section, while still achieving the advantages of the invention.

As shown in FIGS. 2 and 7, a cylindrical shaped bushing 191 is attached, preferably by a weld, to a face of strut 80 that is opposite the inner side 24 of disc 20. A tine mount rod 190, as shown in FIG. 2., is inserted into bushing 191. Tine mount rod 190 has a hooked end 192 and a straight end 193. Bushing 191 is oriented on strut 80 such that the hooked end 192 of tine mount rod 190 engages the substantially horizontal section 185 of tine 180 to support the tine. Straight end 193 extends through bushing 191 and a nut 194 fits over the end 193 to secure tine mount rod 190 to bushing 191.

In operation, the coulter assembly 10 is pulled in the direction indicated by the arrow in FIG. 1 and disc 20 creates a furrow in the soil. The leading edge 132 of scraper assembly 131 is in direct contact with the inner side 24 of disc 20, resulting from the torsion exerted by spring 122 on torque arm 120. Leading edge 132 of scraper assembly 131 is preferably constructed of carbide, resulting in improved hardness and wear resistance of the scraper blade 130. Accordingly, inner side 24 of disc 20 is kept clear of debris and the disc 20 does not become jammed by an accumulation of debris between disc 20 and scraper blade 130. Scraper blade 130 also acts to keep the furrow open while seeds or fertilizer are deposited. Tube holder 150 is attached to one or more tubes (not shown), and seeds or fertilizer are transferred into tube holder 150. Fertilizer or seeds subsequently fall out the bottom 152 of tube holder 150 into the furrow.

If the coulter assembly is used in wet or sticky soil, large sods or clumps of soil may be carried with the disc 20 as it rotates, but the sods will be broken on the outer side 26 by tine 180. Accordingly, tine 180 allows operation of the coulter assembly to continue normally. Outer side 26 of disc 20 is not necessarily kept clean down to its metal surface. If coulter assembly 10 is used in a field which has not been cleared, straw and trash will wrap around tine 180, forming an organic wear pad between tine 180 and disc 20 to prevent wear on the outer side 26 of disc 20. If rocks or other obstructions are encountered in the field, tine 180 will be elevated. Since tine 180 is attached to coupling 86, if the remote end 184 of tine 180 is forced upwards, coupling 86 will rotate and arm 160 will move downward, placing spring 170 into tension and at the same time permitting strut 80 and scraper assembly 131 to elevate since strut 80 and tine 180 are both attached to coupling 86. After the obstruction is passed, tine 180 and strut 80 will return to their original position since arm 160 will move upward until stopped by stop-tab 165.

Numerous modifications, variations, and adaptations may be made to the particular embodiments of the invention described above without departing from the scope of the invention as defined in the claims.

The embodiments of the invention in which an exclusive property or privilege is claimed are defined as follows:

1. A coulter assembly adapted to be mounted on a frame of a farm implement comprising:
    (a) a mounting bracket;
    (b) a strut;
    (c) means for connecting said strut to said mounting bracket;
    (d) a two-sided disc, said two sides of said disc comprising an inner side and an outer side, said disc being rotatably attached to said strut;
    (e) a torque arm pivotally attached to the strut;
    (f) a scraper assembly slidably and rotatably mounted to the torque arm and facing the inner side of the disc; and
    (g) resilient means mounted on the torque arm wherein said scraper assembly is urged against the inner side of the disc by said resilient means of said torque arm and whereby said scraper assembly cleans the inner surface of said disc during operation of the coulter assembly.

2. A coulter assembly adapted to be mounted on a frame of a farm implement comprising:
    (a) a mounting bracket;
    (b) a strut;
    (c) means for connecting said strut to said mounting bracket;
    (d) a two-sided disc, said two sides of said disc comprising an inner side and an outer side, said disc being rotatably attached to said strut;
    (e) a torque arm pivotally attached to the strut;
    (f) a scraper assembly slidably and rotatably mounted to the torque arm and facing the inner side of the disc, said scraper assembly comprising: a scraper blade having a leading edge attached thereto and constructed of carbide; and a hollow tubular member attached to the scraper blade, said tubular member adapted to matingly engage said torque arm and being slidably maintained thereon with a retaining means; and
    (g) resilient means mounted on the torque arm wherein said leading edge of said scraper assembly is urged against the inner side of the disc by said resilient means of said torque arm and whereby said scraper blade cleans the inner surface of said disc during operation of the coulter assembly.

3. A coulter assembly adapted to be mounted on a frame of a farm implement comprising:
    (a) a mounting bracket;
    (b) a strut;
    (c) means for connecting said strut to said mounting bracket;
    (d) a two-sided disc, said two sides of said disc comprising an inner side and an outer side, said disc being rotatably attached to said strut;
    (e) a torque arm assembly fixedly attached to the strut, said torque arm assembly including a torque arm;
    (f) a scraper assembly slidably and rotatably mounted to the torque arm and facing the inner side of the disc, said scraper assembly comprising: a scraper blade having a leading edge attached thereto and constructed of carbide; and a hollow tubular member attached to the scraper blade, said tubular member adapted to matingly engage said torque arm and being slidably maintained thereon with a retaining means; and
    (g) resilient means mounted on the torque arm wherein said leading edge of said scraper assembly is urged against the inner side of the disc by said resilient means of said torque arm assembly and whereby said scraper blade cleans the inner surface of said disc during operation of the coulter assembly.

4. The coulter assembly of claim 3 wherein the torque arm assembly includes:
    (a) a housing fixedly attached to the strut; and wherein the torque arm is rotatably mounted inside the housing.

5. The coulter assembly of claim 2 or 3 wherein the retaining means is a roll pin.

6. The coulter assembly of claim 2 or 3 wherein the retaining means is a spring pin.

7. The coulter assembly of claim 2 or 3 wherein the retaining means is a bolt and a nut.

8. The coulter assembly of claim 3 wherein the leading edge is arc welded to the scraper blade and the tubular member is arc welded to the scraper blade.

9. The coulter assembly of claim 3, said scraper blade having first and second opposing sides; said first side facing the inner side of the disc; said coulter assembly further comprising:
    an insert attached to the scraper blade; said insert protruding beyond said first side of said scraper blade to resist wear of the scraper blade.

10. The coulter assembly of claim 9 wherein the insert is arc welded to the scraper blade.

11. The coulter assembly of claim 10 wherein the insert is made of cast iron.

12. The coulter assembly of claim 3, said scraper blade having a first and second opposing sides, said first side facing the inner side of the disc, said coulter assembly further comprising:
    an insert attached to the scraper blade, said insert protruding beyond said second side of said scraper blade to resist wear on said scraper blade.

13. The coulter assembly of claim 12 wherein the insert is arc welded to the scraper blade.

14. The coulter assembly of claim 13 wherein the insert is made of cast iron.

15. The coulter assembly of claim 3, said scraper blade having first and second opposing sides, said first side facing the inner side of the disc, said coulter assembly further comprising
    an insert attached to the scraper blade, said insert protruding beyond said first and second sides of said scraper blade to resist wear on said scraper blade.

16. The coulter assembly of claim 15 wherein the insert is arc welded to the scraper blade.

17. The coulter assembly of claim 16 wherein the insert is made of cast iron.

18. The coulter assembly of claim 3 further comprising a tube holder for holding a tube for carriage of fertilizer or seeds.

19. The coulter assembly of claim 18 wherein the tube holder is attached to the strut.

20. The coulter assembly of claim 18 wherein the tube holder is attached to the torque arm assembly.

21. The coulter assembly of claim 4 further comprising:
    (a) a bracket attached to the housing; and
    (b) a tube holder for holding a tube for carriage of fertilizer or seeds, said tube holder attached to said bracket, the bracket being attached to the torque arm assembly.

22. The coulter assembly of claim 3 wherein the strut is pivotally connected to said mounting bracket and further comprising resilient means between the mounting bracket and the strut to permit movement of the strut to avoid obstacles when in operation.

23. The coulter assembly of claim 22 wherein the resilient means between the mounting bracket and the strut is a spring.

24. A coulter assembly comprising:
   (a) a substantially vertically oriented mounting bracket having a lower end and an upper end;
   (b) a strut, having an upper end and a lower end;
   (c) a torque arm assembly fixedly attached to the strut, said torque arm assembly including a torque arm;
   (d) a coupling attached to the upper end of the strut and pivotally connected to the lower end of the mounting bracket;
   (e) a disc, rotatably attached to the lower end of the strut whereby an inner side of the disc faces the strut;
   (f) a scraper assembly slidably and rotatably mounted to the torque arm and facing the inner side of the disc, said scraper assembly comprising: a scraper blade having a leading edge attached thereto and constructed of carbide; and a hollow tubular member attached to the scraper blade, said tubular member adapted to matingly engage said torque arm and being slidably maintained thereon with a retaining means; and
   (g) resilient means mounted on the torque arm wherein said leading edge of said scraper assembly is urged against the inner side of the disc by said resilient means of said torque arm assembly and whereby said scraper blade cleans the inner surface of said disc during operation of the coulter assembly; and
   (h) a spring connected between the mounting bracket and the coupling whereby the coupling will rotate upon elevation of the strut to avoid obstacles when in operation.

25. The coulter assembly of claim 24 further comprising an insert attached to the scraper blade for reducing wear on said scraper blade.

\* \* \* \* \*